US007114247B2

(12) United States Patent
Swantner et al.

(10) Patent No.: US 7,114,247 B2
(45) Date of Patent: Oct. 3, 2006

(54) METHOD OF MAKING AN ELECTRICAL CONNECTOR

(75) Inventors: Michael J. Swantner, Warren, PA (US); Douglas G. Seymour, York, PA (US); Shane Brown, York, PA (US)

(73) Assignee: OSRAM Sylvania Inc., Danvers, MA (US)

( * ) Notice: Subject to any disclaimer, the term of this patent is extended or adjusted under 35 U.S.C. 154(b) by 162 days.

(21) Appl. No.: 10/974,345

(22) Filed: Oct. 27, 2004

(65) Prior Publication Data

US 2006/0085977 A1 Apr. 27, 2006

(51) Int. Cl.
*B23P 19/00* (2006.01)

(52) U.S. Cl. ............................ 29/747; 29/837; 29/857; 29/858; 29/884

(58) Field of Classification Search .................. 29/747, 29/884, 837, 857, 858; 439/374, 246, 401, 439/624, 66
See application file for complete search history.

(56) References Cited

U.S. PATENT DOCUMENTS 4,008,941 A 2/1977 Smith .......................... 339/91
4,392,699 A * 7/1983 Weingartner ................ 439/686
4,779,948 A * 10/1988 Wais et al. .................... 385/88
5,413,504 A * 5/1995 Kloecker et al. ........... 439/620
5,542,856 A * 8/1996 Wood ......................... 439/281
5,851,121 A 12/1998 Thenaisie et al. ............. 439/63
6,162,093 A 12/2000 Sudol et al. ................ 439/607
6,328,126 B1 * 12/2001 Breed et al. ................ 180/274
6,776,621 B1 8/2004 Dye ............................ 439/63

FOREIGN PATENT DOCUMENTS

EP 1187268 3/2002

* cited by examiner

*Primary Examiner*—A. Dexter Tugbang
*Assistant Examiner*—Tai Van Nguyen
(74) *Attorney, Agent, or Firm*—Kenneth D. Labadda

(57) ABSTRACT

A method of making an electrical connector comprises the steps of: forming an electrically conductive member having a body including an interface, the body having a longitudinal chamber therein; forming an electrically conductive pin; overmolding the interface with a first electrically insulating material; overmolding at least a part of the electrically conductive pin with a second electrically insulating material to form an overmolded electrically conductive pin; and inserting the overmolded electrically conductive pin into the longitudinal chamber.

8 Claims, 4 Drawing Sheets

METHOD OF MAKING AN ELECTRICAL CONNECTOR

TECHNICAL FIELD

This invention relates to electrical connectors and more particularly to such connectors for receiving a coaxial cable contact. Still more particularly, it relates to a method of making such connectors.

BACKGROUND ART

One form of such a connector comprises an electrically conductive member having a longitudinal portion and a transverse portion, at least a part of the longitudinal portion providing a cylindrical hollow end and the transverse portion having protruding legs for engagement with circuit traces on a printed circuit board, and an electrically conductive pin positioned with respect to the electrically conductive member. At least a first part of the electrically conductive pin is substantially centrally located within the hollow end, and a single-piece electrically insulating body surrounds the electrically conductive member and the electrically conductive pin. The single-piece, electrically insulating body was achieved by over-molding the electrically conductive member and the electrically conductive contact pin as they are held in place in a suitable mold cavity.

The small size of the parts and the complexity of the mold parts and the procedures for loading the parts have proved difficult and expensive. Thus, it would be an advance in the art to simplify the method of making such contacts.

DISCLOSURE OF INVENTION

It is, therefore, an object of the invention to obviate the disadvantages of the prior art.

It is another object of the invention to enhance the method of making electrical contacts.

These objects are accomplished, in one aspect of the invention, by a method of making an electrical connector comprising the steps of: forming an electrically conductive member having a body including an interface, the body having a longitudinal chamber therein; forming an electrically conductive pin; overmolding the interface with a first electrically insulating material; overmolding at least a part of the electrically conductive pin with a second electrically insulating material to form an overmolded electrically conductive pin; and inserting the overmolded electrically conductive pin into the longitudinal chamber.

The method steps of the invention greatly simplify the mold requirements and provide a physically strong electrical connector.

BEST MODE FOR CARRYING OUT THE INVENTION

For a better understanding of the present invention, together with other and further objects, advantages and capabilities thereof reference is made to the following disclosure and appended claims taken in conjunction with the above-described drawings.

Figure 1:
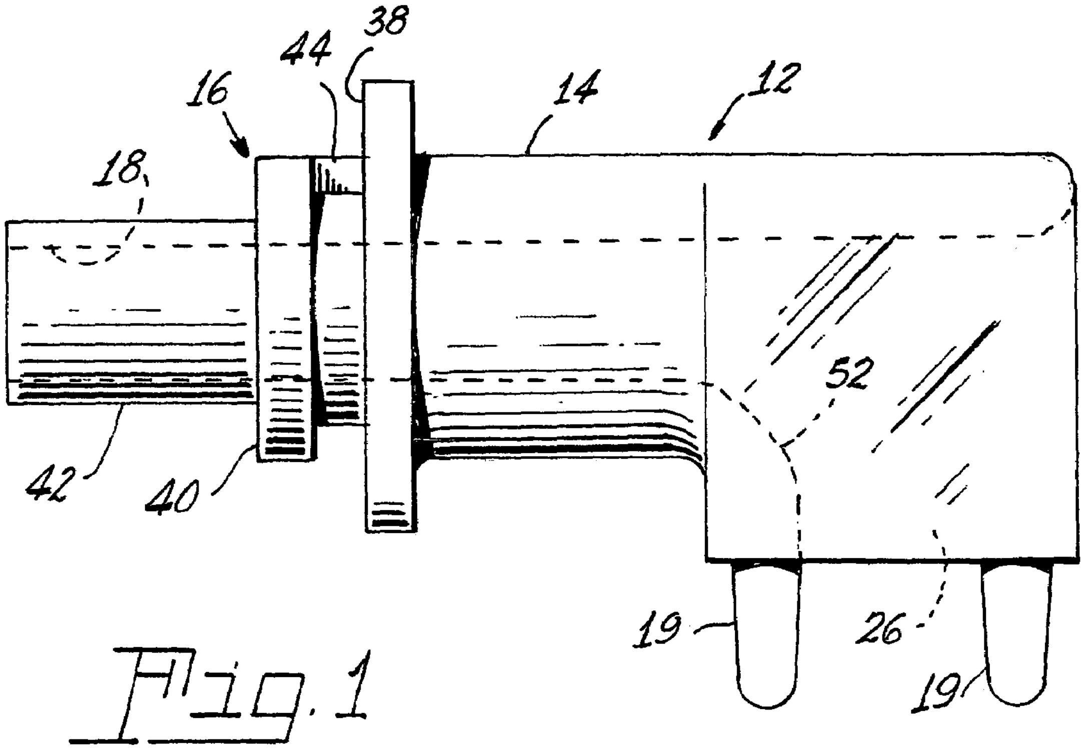
FIG. 1 is an elevational view conductive member.
Figure 3:
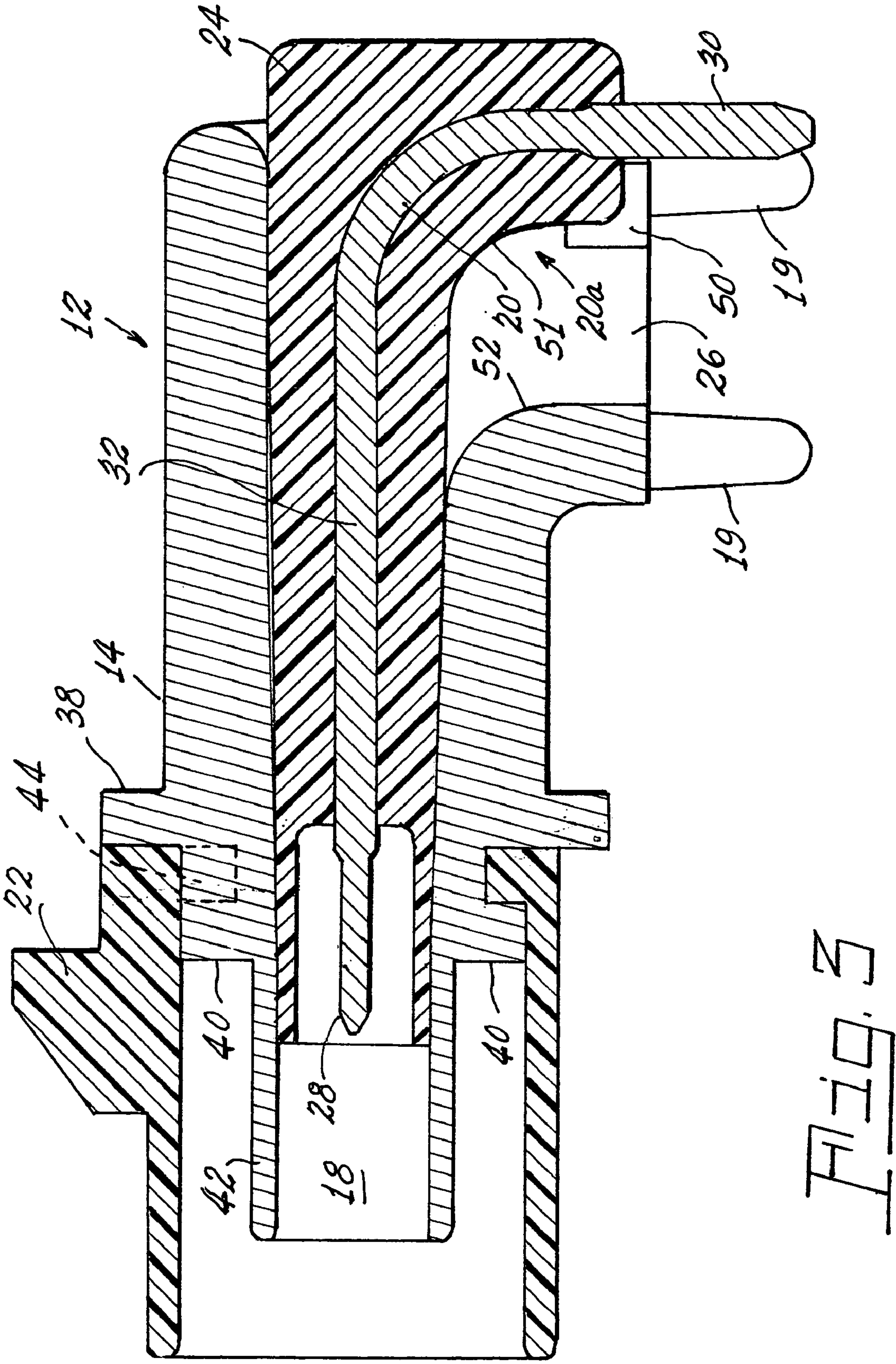
FIG. 3 is an elevational sectional view of the conductive member with the conductive pin partially inserted.
Figure 4:
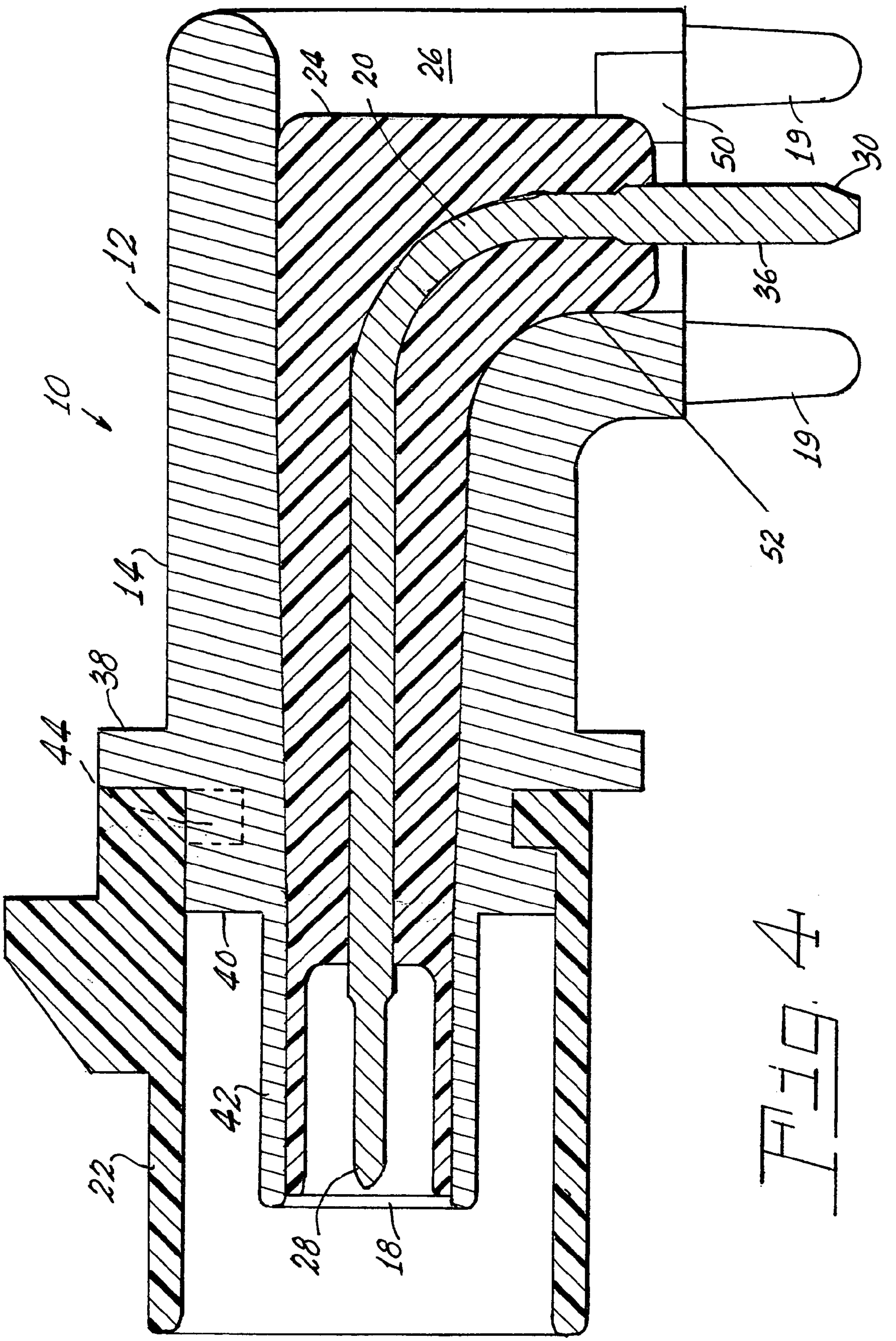
FIG. 4 is an elevational sectional view of the conductive member with the conductive pin completely inserted.
Figure 5:
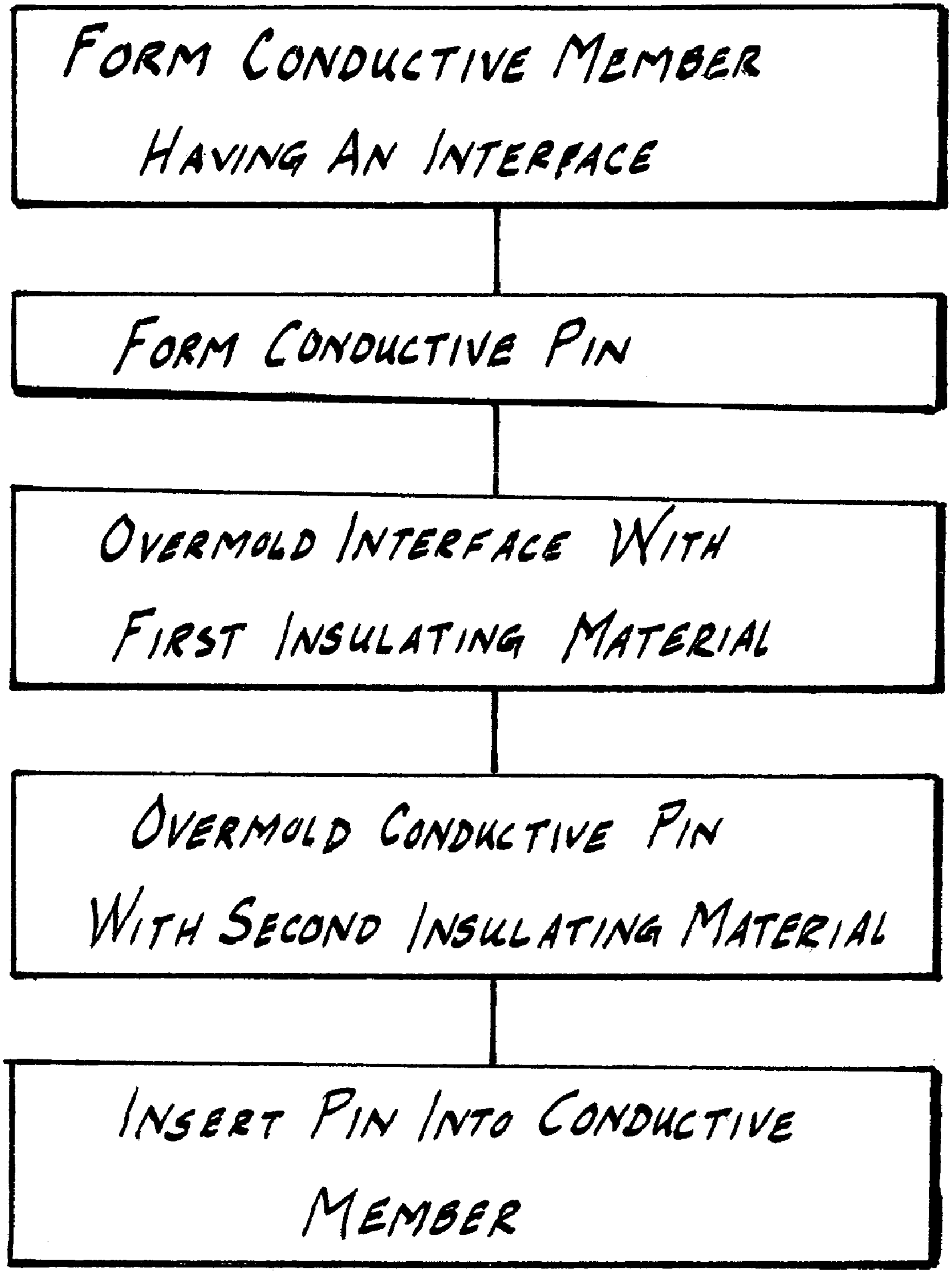
FIG. 5 is a flow chart of the method of the invention.

Referring now to the drawings with greater particularity, there is shown in FIG. 4 an electrical connector 10 having an electrically conductive member 12 preferably formed from die-cast zinc, with a body 14. One end of the body 14 has an interface 16 shown more clearly in FIG. 1. The interface 16 comprises a first circumferential flange 38, a second circumferential flange 40 spaced therefrom, and a tubular projection 42. An anti-rotation lug 44 extends between the first and second circumferential flanges. The interface 16 is overmolded with a first electrically insulating material 22 that is shown more clearly in FIGS. 3 and 4. A preferred material is 33% glass filled nylon, which fills the space between the first and second flanges 38, 40 and is kept from rotating about the axis of the body 14 by the anti-rotation lug 44.

Figure 2:
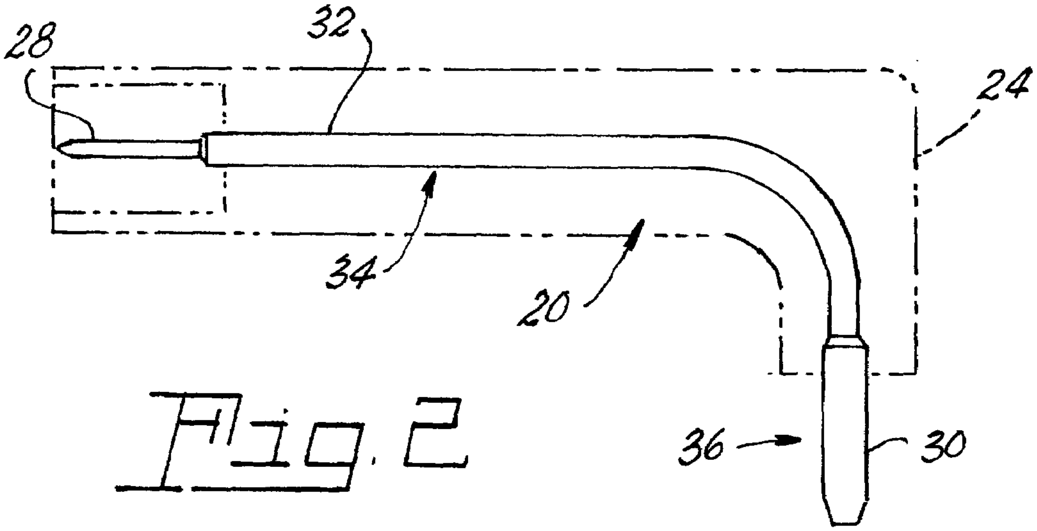
FIG. 2 is an elevational view of the conductive pin.

The body has a longitudinal chamber 18 axially arrayed therethrough and a second chamber 26 that is formed at a right angle to the longitudinal chamber 18. In a preferred embodiment of the invention the body 12 has four legs 19, which, in the final construction, will provide the ground connections for the connector An electrically conductive pin 20 is L-shaped with two legs 34, 36 and has two termini 28, 30 connected by an intermediate portion 32 and is preferably of brass. The pin 20 has its intermediate portion 32 overmolded with a second electrically insulating material 24 that is preferably unfilled nylon to form an overmolded electrically conductive pin **20*a*. The insulating material 24 is shown in phantom in FIG. 2**.

The overmolded pin **20*a* is inserted freely into the longitudinal chamber 18 until it reaches the position shown in FIG. 3. At that point the material 24 covering part of the leg 36 encounters a locking feature 50 in the form of oppositely disposed protuberances formed inside the second chamber 26. The protuberances 50 provide a cylindrical surface to the material 24 and can be by-passed by the application of sufficient force, which will seat the overmolded pin 20*a* within the longitudinal chamber 18. The progress of the overmolded pin 20*a* into the chamber 18 is stopped when a forward wall 51 of the material 24 covering the leg 36 encounters a stop 52 formed in the transverse chamber 26**.

There is thus provided a method of making electrical connectors that involves relatively simple overmolding procedures. It eliminates several assembly steps and makes the connector less tolerance sensitive than current products.

While there have been shown and described what are present considered to be the preferred embodiments of the invention, it will be apparent to those skilled in the art that various changes and modifications can be made herein without departing from the scope of the invention as defined by the appended claims.

What is claimed is:

1. A method of making an electrical connector comprising the steps of:

forming an electrically conductive member having a body including an interface, said body having a longitudinal chamber therein; said interface comprising a first circumferential flange, a second circumferential flange spaced therefrom, and an anti-rotation lug extending between the first and second circumferential flanges;

forming an electrically conductive pin;

overmolding said interface with a first electrically insulating material;

overmolding at least a part of said electrically conductive pin with a second electrically insulating material to form an overmolded electrically conductive pin; and inserting said overmolded electrically conductive pin into said longitudinal chamber.

2. The method of claim 1 wherein said electrically conductive member is formed with a second chamber at a right angle to said longitudinal chamber and connected thereto.

3. The method of claim 2 wherein said electrically conductive pin is formed with two termini connected by an intermediate portion and said intermediate portion only is overmolded with said second electrically insulating material.

4. The method of claim 3 wherein said electrically conductive pin is formed with two legs at a right angle to each other and said second chamber includes locking means for engaging a part of said electrically insulating material formed about one of said legs.

5. The method of claim 1 wherein said electrically conductive member is die-cast zinc.

6. The method of claim 1 wherein said electrically conductive pin is brass.

7. The method of claim 1 wherein said first insulating material is 33% glass-filled nylon.

8. The method of claim 7 wherein said second insulating material is unfilled nylon.

* * * * *